US006307869B1

United States Patent
Pawelski

(10) Patent No.: US 6,307,869 B1
(45) Date of Patent: Oct. 23, 2001

(54) SYSTEM AND METHOD FOR PHASE RECOVERY IN A SYNCHRONOUS COMMUNICATION SYSTEM

(75) Inventor: Robert Lee Pawelski, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/111,597

(22) Filed: Jul. 7, 1998

(51) Int. Cl.[7] ...................................................... H04J 3/06
(52) U.S. Cl. ........................... 370/516; 370/519; 375/371
(58) Field of Search .................... 370/516, 519; 375/220, 371

(56) References Cited

U.S. PATENT DOCUMENTS

| | | | |
|---|---|---|---|
| 4,756,011 | * 7/1988 | Cordell .................................. | 375/371 |
| 5,550,860 | * 8/1996 | Georgiou et al. ..................... | 375/220 |
| 5,844,954 | * 12/1998 | Casasanta et al. .................... | 370/519 |
| 5,936,964 | * 8/1999 | Valko et al. .......................... | 370/519 |

OTHER PUBLICATIONS

Plas Van Der G et al.: "ATM Over Passive Optical Networks: System Design and Demonstration" Proceedings of the SPIE, vol. 1786, Nov. 13, 1992, pp. 48–57.

Breemen Van J et al.: "Asynchronous Transfer Mode Over a Passive Optical Network: The Realization of a High Speed Demonstrator System" International Journal of Optoelectronics (Incl. Optical Computing & Processing), vol. 11. No. Nov. 1, 1997, pp. 71–84.

Onishi K et al.: "A System Implementation for PDS Optical Subscriber Loop" Conference on Optical/Hybrid Access Networks, Jan. 1, 1992, pp. 4.09.01–4.09.06.

Eldering C A et al.: "Digital Burst Mode Clock Recovery Technique For Fiber–Optic Systems" Journal of Lightwave Technology, vol. 12, No. 2 Feb. 1, 1994, pp. 271–278.

* cited by examiner

*Primary Examiner*—Salvatore Cangialosi

(57) ABSTRACT

A system and method is provided for generating a sequence of phase signals. One of the sequence of phase signals that is most closely aligned with a data packet is selected. The data packet is phase aligned with the selected one of the sequence of phase signals. The phase alignment of the data packet includes the generation of a clock signal in alignment with one of the sequence of phase signals.

10 Claims, 7 Drawing Sheets

SYSTEM AND METHOD FOR PHASE RECOVERY IN A SYNCHRONOUS COMMUNICATION SYSTEM

BACKGROUND OF THE INVENTION

The present invention relates generally to the field of digital communication systems more particularly to phase recovery in a synchronous communication system.

The use of fiber optic communications continues to grow worldwide at a rapid pace. existing communications systems do not include digital and systems and methods for phase recovery to accommodate the expanding number of individual users.

Currently, fiber optic communication systems distribute signals, from a central office, through a fiber distribution system, to a number of different customers each at different distances from the central office. These systems use asymmetric bandwidths for both the downstream data (from the central office to the customer) and the upstream data (from the customer to the central office) directions. As an example, a communication system, such as Asynchronous Transfer Mode (ATM) system, uses a downstream link of 622.08 Mb/s and upstream data path of 155.52 Mb/s.

However, a problem arises in such ATM systems as the bursts of information travel along the upstream data link from the customers, at different distances, to the central office because the differences in distance create phase delays in the upstream data received at the central office. Additionally, this problem is usually compounded because many fiber optic communication systems use time division multiple access (TDMA) coding schemes. Under a TDMA coding scheme, the timing arrangement requires each customer to input a time variation in a time slot so that the information arrives at the central office in a timely fashion. This requirement is necessary because in a TDMA system if two or more customers from different directions send data through the upstream link, the customer that is farther away has to send his information sooner so that it falls in a time slot behind the customer that is closer. Again as in the non-TDMA case, each packet of incoming TDMA data at the central office is going to have a phase difference from the others. Thus recovering a clock reference from the upstream data is crucial for the proper synchronization and recovery of the upstream data because the recovered upstream data clock reference eliminates the effects of the phase delays on the upstream data.

A phase locked looped (PLL) has been used to recover this type of upstream data. An ATM type of system, as an example, requires that each packet of incoming data contains a preamble that allows a PLL to realign itself to each packet of incoming data. However, PLLs have numerous problems. The main problem is inadequate speed of signal acquisition. A PLL must adjust quickly to the incoming data packet when the size of the preamble is only a few bits long for an efficient transmission.

The customer premises equipment (CPE) units (telephones, PBX switches, etc.) receive the downstream clock, divide it by four to get the upstream clock, and then send the upstream data information back, in a synchronized fashion, to the central office equipment. The process of sending the upstream data information back to the central office introduces phase delays that effect the speed of signal acquisition of the PLL.

Thus, there is a need to develop an all digital phase recovery system (ADPRS) and method that uses the high speed downstream data clock to derive the upstream data clock in a fashion that is all-digital and would adapt very rapidly to the phase of each different packet of data as it comes in. However, at present, there is no such implementation.

SUMMARY OF THE INVENTION

The invention and methods are directed to recovering the phase of the upstream data link in a communication system using an all-digital method. While the following examples are directed to an ATM communication system the invention and methods described apply equally well to non-ATM systems.

In this invention, the above problems discussed in the background of the prior art are solved, and a number of technical advances are achieved in the art by use of the downstream clock in deriving the upstream clock.

In accordance with one aspect of the present invention, the upstream data transmission is accomplished by using the clock derived from the downstream data transmission. The invention provides, for subsequent processing, a lower speed clock with a fixed data phase relationship that prevents false byte alignment because the invention realigns the phase on each received cell independent of which CPE transmitted the cell.

BRIEF DESCRIPTION OF THE DRAWINGS

The advantages of this invention will become apparent upon reading the following detailed description and upon reference to the drawings in which.

DETAILED DESCRIPTION

Figure 1:
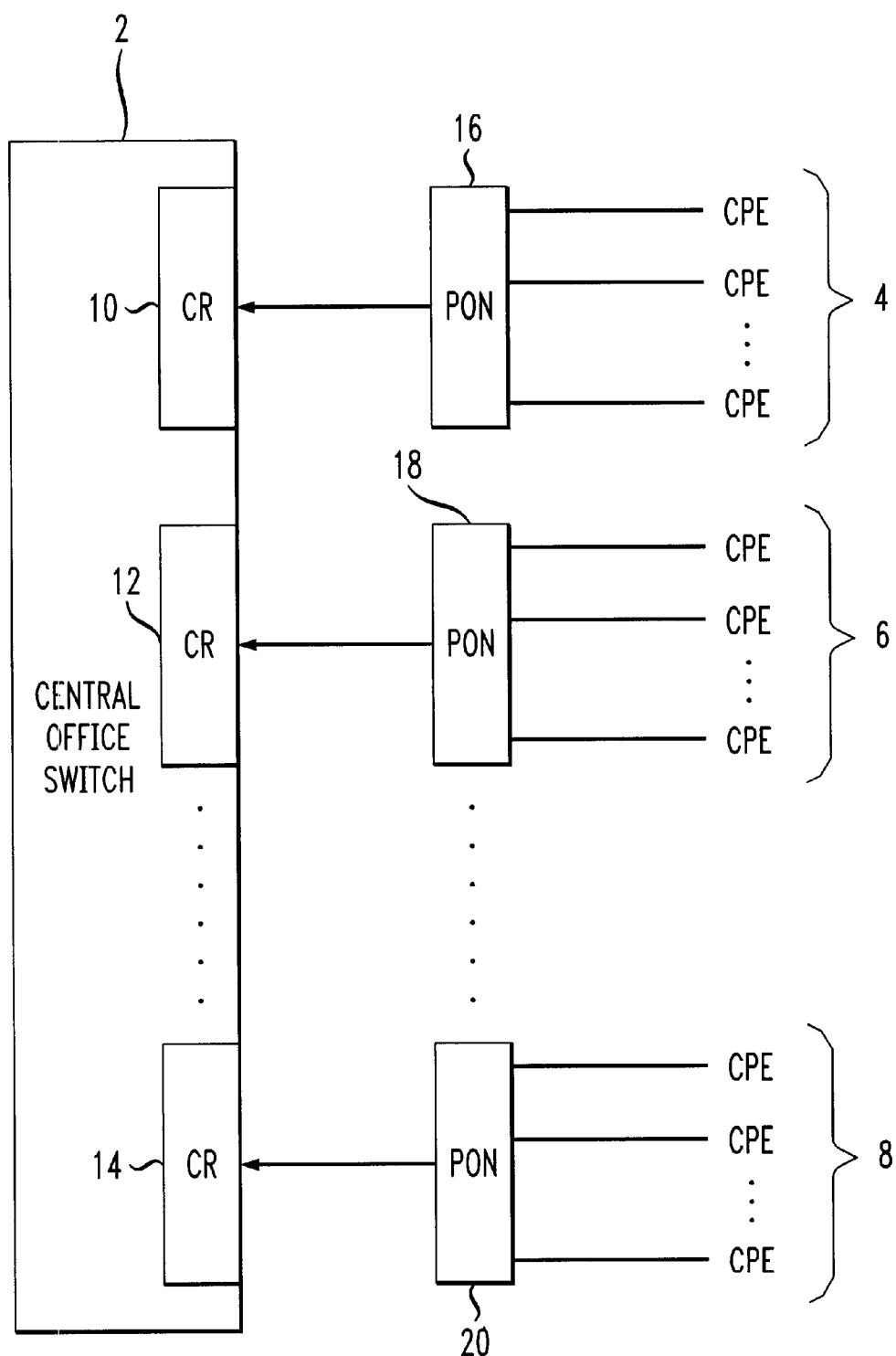
FIG. 1 shows an example of a block diagram for an ATM type of communication system in accordance with the invention using a central office switch and a number of customer premise units (CPE)

Referring to FIG. 1, an example of a digital communication system that incorporates the present invention. The digital communication system is shown including a central office switch 2 and a plurality of CPE units 4, 6 and 8. The central office switch 2 has a plurality of clock recovery (CR) circuits 10, 12, and 14. Each CR circuit 10, 12 and 14 is connected to the CPE units 4, 6 and 8 through a passive optical network (PON). As an example, CR 10 is connected to the set of CPE units 4 through PON 16. CR 12 is connected to the set of CPE units 6 through PON 18. CR 14 is connected to the set of CPE units 8 through PON 20. Thus, the upstream data is transmitted from the individual CPE units to the corresponding CR circuit at which the upstream data is recovered and processed by the central office switch 2. The path of the downstream data from the central office switch 2 to each of the CPEs through the PONs is not shown.

Figure 2:
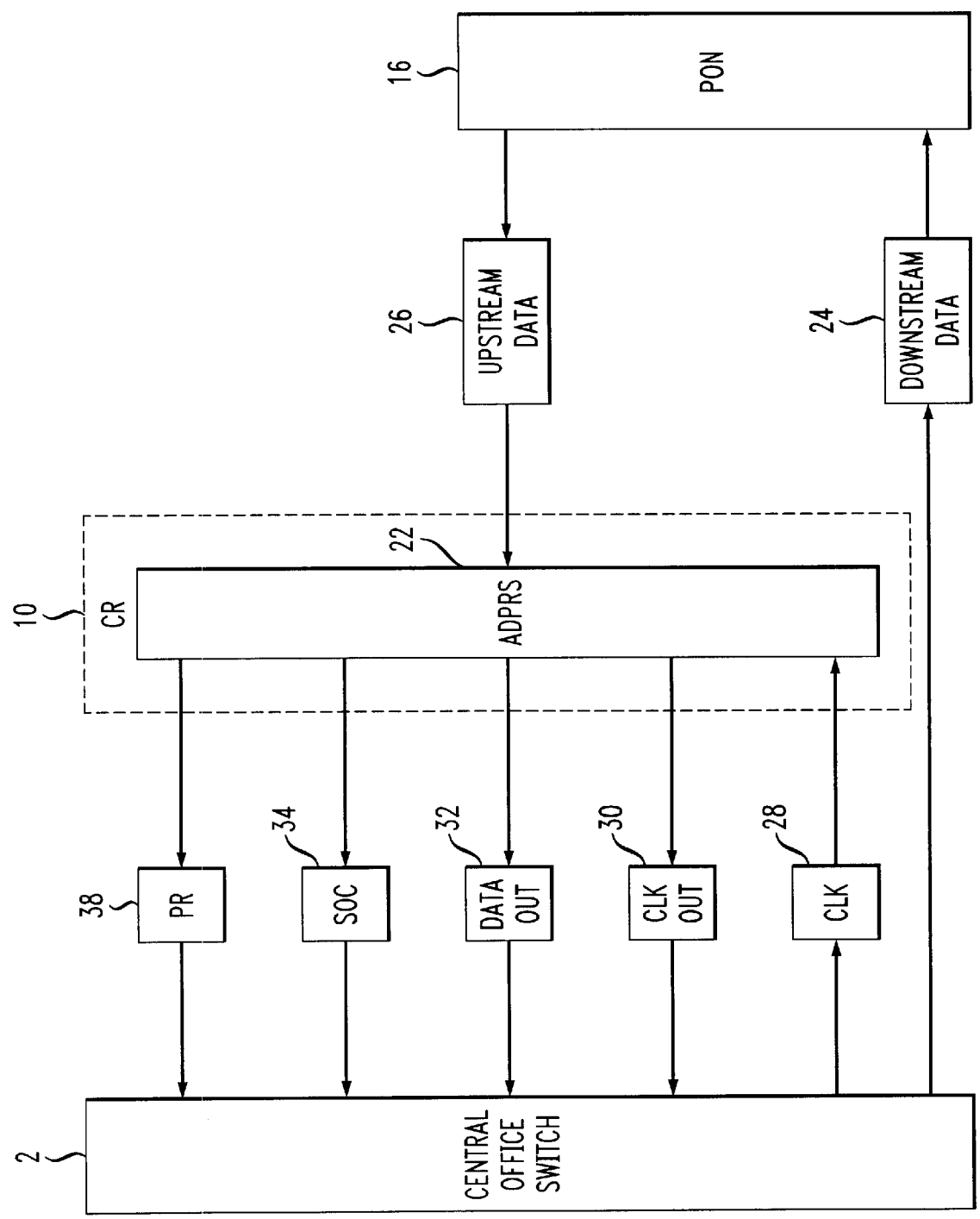
FIG. 2 shows the ADPRS of FIG. 6 in combination with the elements of the system in FIG. 1.

FIG. 2 shows an ADPRS 22 in combination with the elements of the system in FIG. 1. As an example, the ADPRS 22 is inside the CR 10. The figure shows the ADPRS 22 connected to the central office switch 2 and the PON 16. The central office switch 2 sends the PON 16 the downstream data 24 so that it can be transmitted to the corresponding CPEs of FIG. 1. The PON 16 sends the ADPRS 22 an upstream data 26. The central office switch 2 also sends the ADPRS 22 a downstream clock (CLK 28) to process the received upstream data 26. When the ADPRS 22 receives the upstream data 26 and the CLK 28, the ADPRS 22 produces a recovered upstream data clock (CLK OUT 30), a recovered output from the upstream data (DATA OUT 32), a start of cell (SOC 34) indicator, and preamble (PR 38) sequence. The CLK OUT 30, DATA OUT 32, SOC 34, and PR 38 are all sent to the central office switch 2 for processing.

Figure 3:
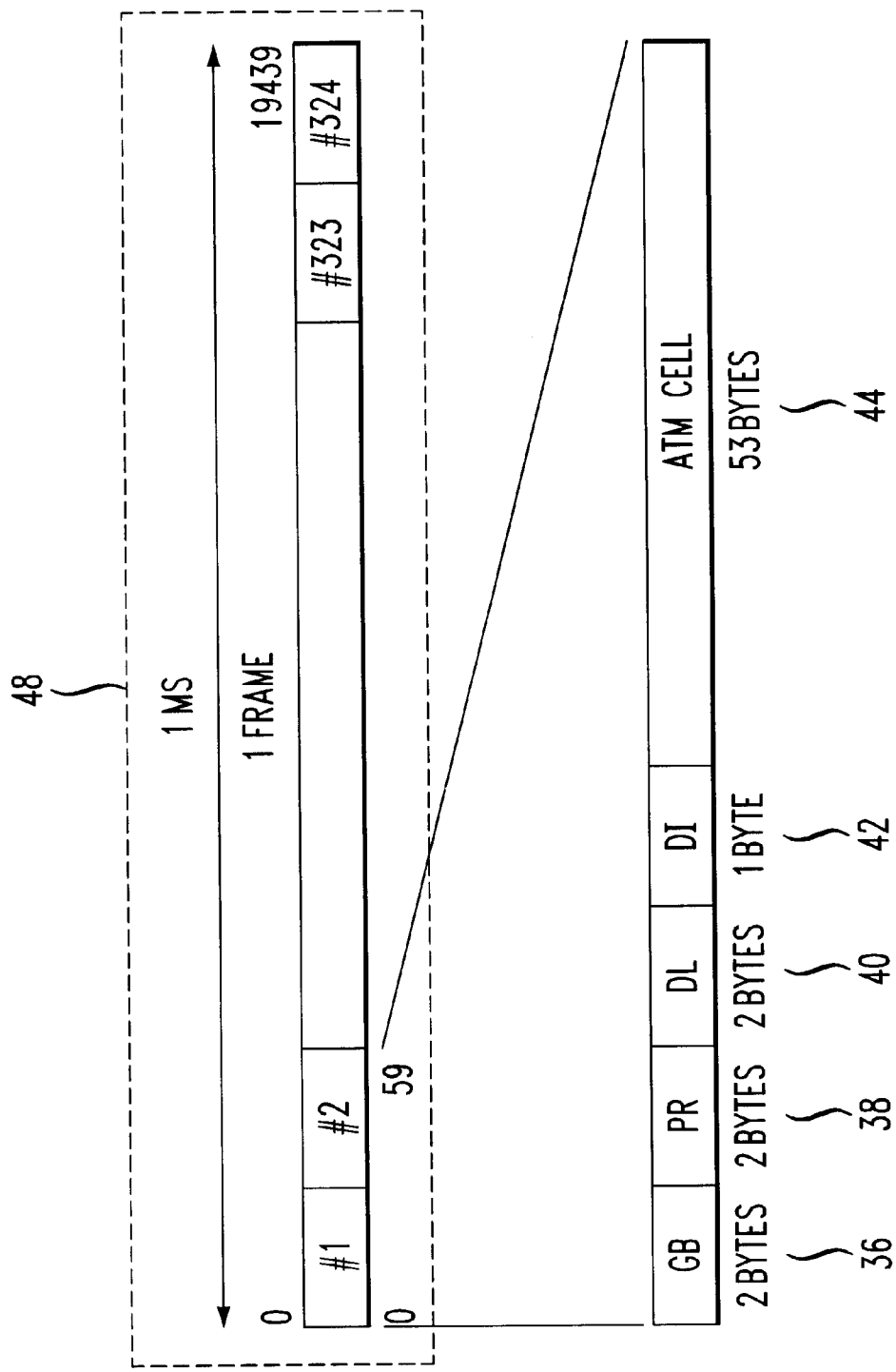
FIG. 3 is an illustration of a time slot structure for the upstream data format as defined by an ATM system and used in the communication system of FIG. 11.

In FIG. 3 an example of a time slot frame 48 structure is shown for the upstream data 26 format of FIG. 2. The frame 48 is one millisecond long and is composed of 324 cell slots each 60 bytes long for a total frame length of 19,440 bytes. Each cell slot has five sub-cells. The first three sub-cells are each two bytes and have the guard band (GB) 36, the PR 38, and a delimiter (DL) 40. A fourth sub-cell is a one byte data indicator (DI) 42 and a fifth sub-cell is a fifty three byte asynchronous transfer mode (ATM) cell 44.

The upstream data 26 of FIG. 2 is transmitted via the ATM cell 44. The other sub-cells 36, 38, 40, and 42 transmit the header information for the system. The GB 36 is defined as all zeros and keeps the cell slots from interfering with each other. The PR 38 is filled with the binary pattern 1010101010101010 and is used for the phase recovery. Finally, the DL 40 is filled with a value of 1011001111010000 and identifies the byte alignment while the DI 42 identifies the type of cell being transmitted.

Figure 4:
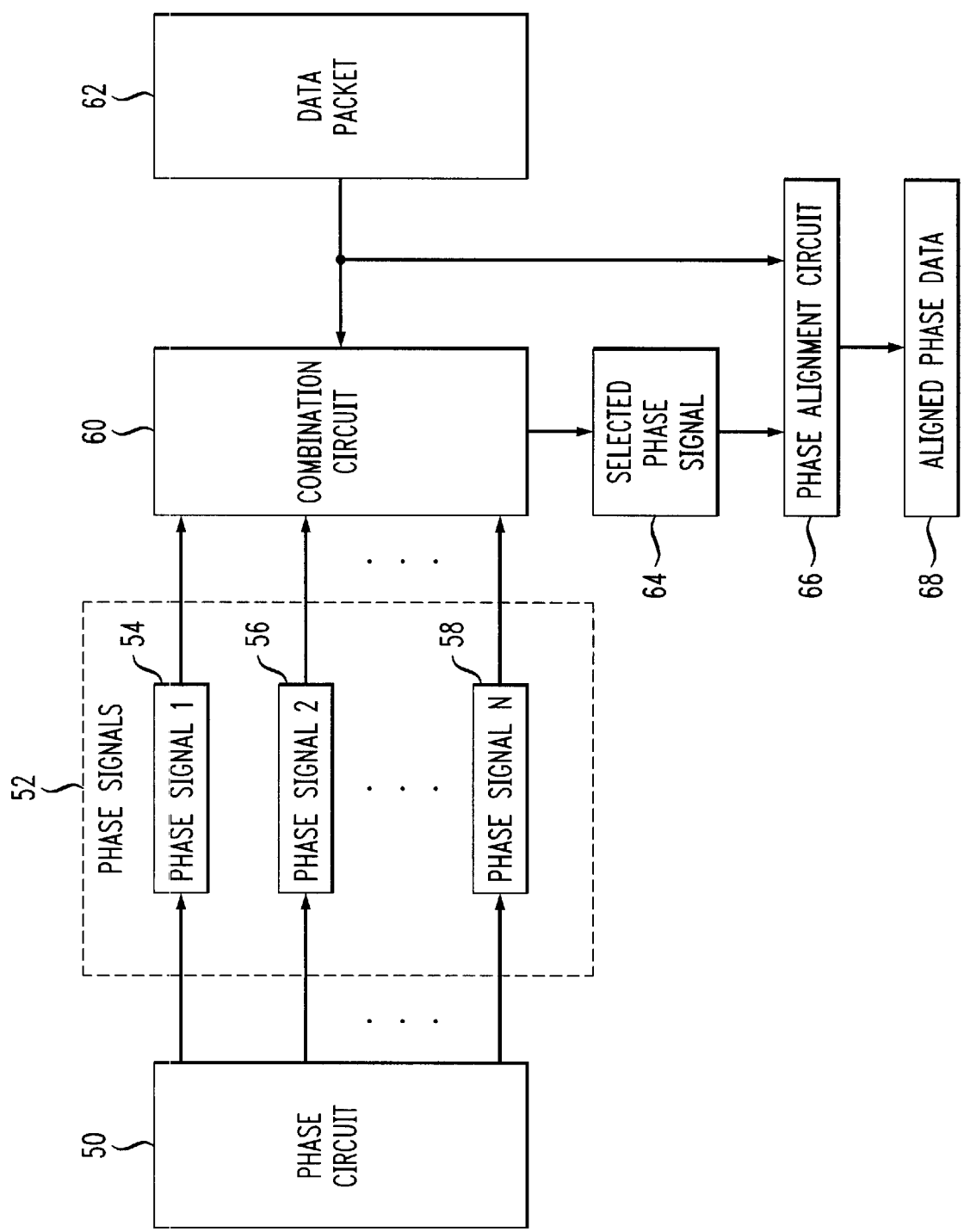
FIG. 4 is a functional block diagram of the ADPRS of FIG. 2 in accordance with the invention.

FIG. 4 is a functional block diagram of the ADPRS 22 of FIG. 2 in accordance with the invention. FIG. 4 shows a phase circuit 50, a combination circuit 60, and a phase alignment circuit 66, which are the main sub-circuits of the ADPRS 22.

The phase circuit 50 generates a sequence of phase signals 52. The phase circuit 50 generates N phase signals 54, 56, and 58. For illustration purposes N is chosen to be four. The phase signals 52 are inputted into a combination circuit 60 that combines the individual phase signals (such as 54, 56, and 58) with a data packet 62 and produces a selected phase signal 64 that is closest to the data packet 62.

The data packet 62 is the time slot frame 48 structure in FIG. 3 of the upstream data 26 of FIG. 2. The selected phase signal 64 is input into a phase alignment circuit 66 that aligns the data packet 62 with the selected phase signal 64 and produces a aligned phase data sequence 68. The aligned data sequence is the DATA OUT 32 of FIG. 2.

Figure 5:
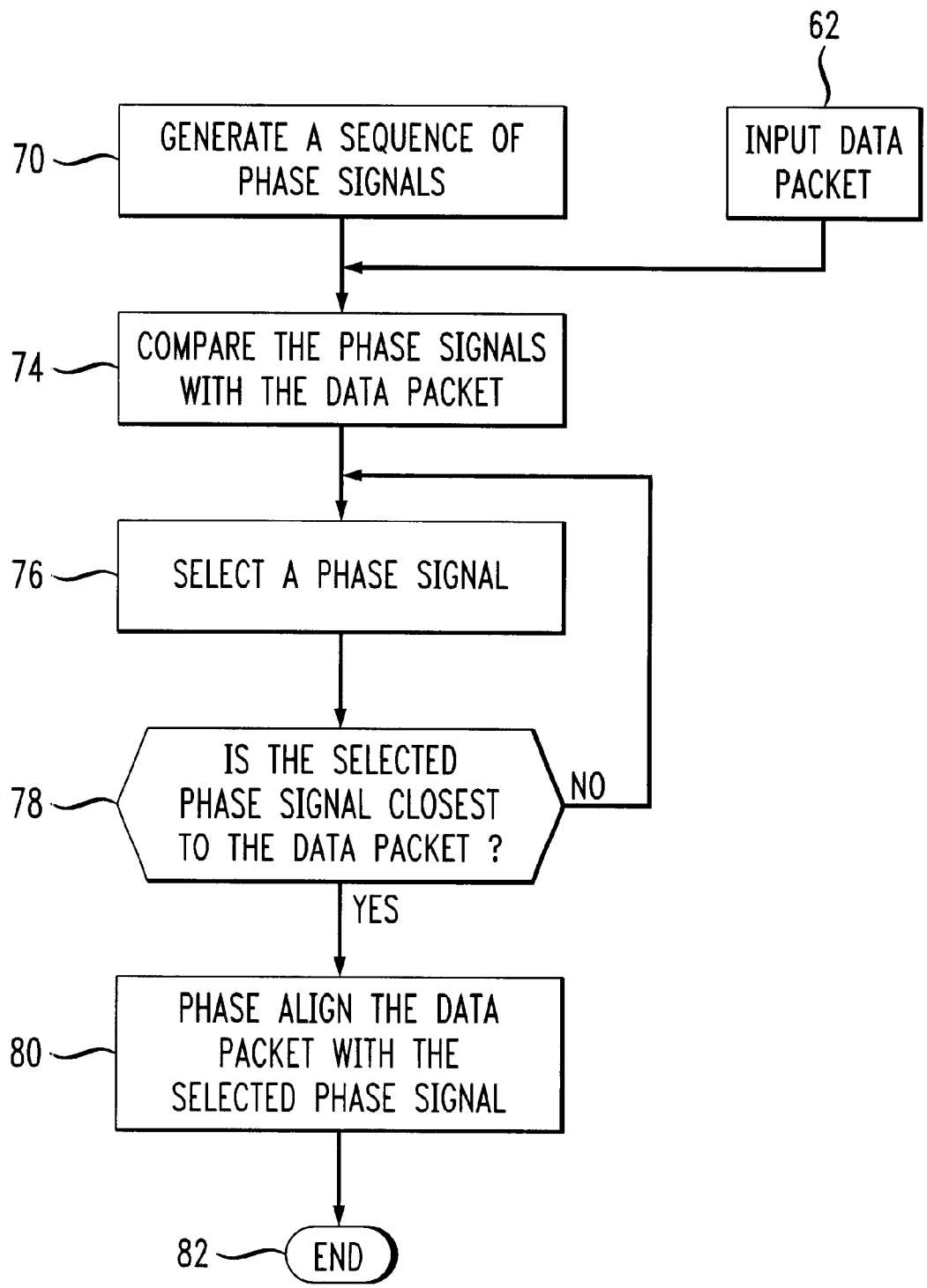
FIG. 5 is a flow chart showing the steps performed by the ADPRS of FIG. 2.

FIG. 5 is a flow chart showing the steps performed by the FIG. 4 elements of the ADPRS 22 of FIG. 2. The phase circuit 50 of FIG. 4 performs the first step. The phase circuit 50 generates a sequence of phase signals 52 in step 70. The combination circuit 60 of FIG. 4 then performs multiple steps. The combination circuit 60 compares the phase signals 52 with the data packet 62 and selects a phase signal in step 76. Next a test is performed in decision step 78 to see if the selected phase signal is closest to the data packet 62. If the answer is no, the decision step 78 sends the process back to step 76 and select another phase signal to test. If the answer is yes, the decision step 78 sends the selected phase signal to the phase alignment circuit 66 that aligns the data packet with the selected phase signal in step 80, produces the aligned phase data 68 of FIG. 4, and ends the process at step 82.

Figure 6:
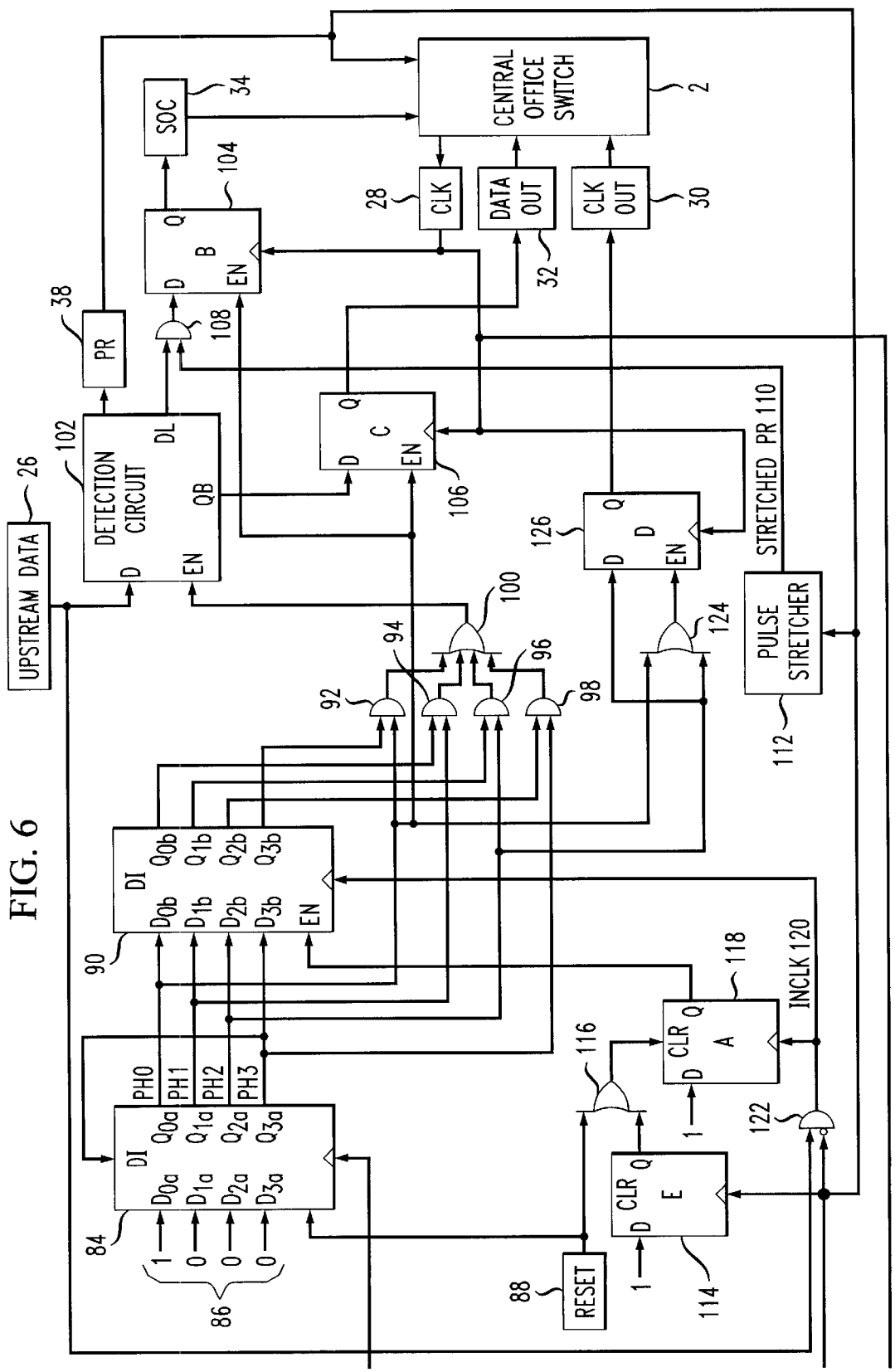
FIG. 6 is a circuit diagram of the ADPRS of FIG. 2 in accordance with the invention.

FIG. 6 is a circuit diagram of the ADPRS 22 in FIG. 2 for the invention. As an example based on G3, the circuit uses the downstream data link 622.08 MHz as the downstream clock source (CLK) 28. At initialization, a four bit shift register 84 is loaded with the binary values 0001 86 at the terminals D0a, D1a, D2a, and D3a respectively by reset 88 which is synchronous with CLK 28. The outputs Q0a, Q1a, Q2a, and Q3a of the shift register 84 containing phase information PH0, PH1, PH2, and PH3 are feed into the corresponding input terminals D0b, D1b, D2b, and D3b of a four bit holding latch 90. The corresponding outputs of the shift register 84 and the four bit latch 90 are first individually combined in separate AND gates (PH0 AND Q3b at gate 92, PH1 AND Q0b at gate 94, PH2 AND Q1b at gate 96, and PH3 and Q2b at gate 98) and then combined again in a four bit OR gate 100. The output of OR gate 100 is then used to enable a detector circuit 102 while PH0 enables a flip-flop B 104 and a flip-flop C 106. Both flip-flop B 104 and flip-flop C 106 use CLK 28. The upstream data 26 is input into the D terminal of the detector circuit 102. Then, the DL 40 output (binary sequence 1011001111010000) of the detector circuit 102 is input into an AND gate 108 which is ANDed with a stretched PR 110 from a pulse stretcher 112 and the PR 38. The $Q_B$ (the data closest to center bit) output of the detector circuit 102 is input into the D terminal of flip-flop C 106. The Q terminal of flip-flop C 106 produces the DATA OUT 32 and the Q terminal of flip-flop B 104 produces the SOC 34 information. The detection circuit 102 also produces the PR 38 which is input into a flip-flop E 114 and the pulse stretcher 112.

Flip-flop E 114 always has a one value at the D terminal and is clocked by PR 38. The output of flip-flop E 114 is combined with the reset 88 in OR gate 116 and then input into a SET input of a flip-flop A 118. Flip-flop A 118 always has a zero value at the D terminal and is clocked by an INCLK 120. INCLK 120 is generated by the combining of the inverse of CLK 28 with the upstream data 26 in an AND gate 116. INCLK 120 also clocks the four bit holding latch 90. The output of flip-flop A 118 is input into the enablement of the four bit holding latch 90 and clear terminal of flip-flop E 114.

The PH0 and PH2 values from the shift register 84 are combined in AND gate 124 and input into the enablement of flip-flop D 126. The D input terminal of flip-flop D 126 is connected to the PH2 value of the shift register 84 and the flip-flop D 126 output CLK OUT 30.

After reset, the initialization binary value 0001 86, initially loaded into the shift register 84, rotates through four binary values in the shift register 84 providing the phase encoding (phase signals of FIG. 4) for PH0, PH1, PH2, and PH3. PH1 corresponds to the initial binary value 0001 86. When the upstream data 26 goes to a high state the PR 38 value goes high for two bits which clocks flip-flop E 114. Flip-flop E 114 has a one value at its D terminal so it then sets flip-flop A 118 high when INCLK 120 is high. INCLK 120 only goes high when data is present because it is the result of upstream data 26 being ANDed with the inverse of CLK 28. Once flip-flop A 118 goes high it enables the latch 90 and clears the flip-flop E 114.

Once the latch 90 is enabled it accepts the phase signals PH0, PH1, PH2, and PH3 from the shift register 84 and holds onto the phase value until the next PR 38 is received by the system. Until the next PR 38 is received, the shift register 84 counts through all the phases without loading the latch 90. The combinatorial gates 92, 94, 96, 98, and 100 the counted phase value of the shift register 84 with the stored phase value in the latch 90. A high value at OR gate 100 will only be produced when the counted phase value of the shift register 84 matches the stored phase value of the latch 90.

The detector circuit 102 is enabled when the counted phase value of the shift register 84 matches the stored phase value of the latch 90. Once enabled the detector circuit 102 processes the upstream data 26 input and extracts the PR 38 cell, the DL 40 cell, and the $Q_B$. The extracted PR 38, from the detector circuit 102, is input into the pulse stretcher 112 and used to clock flip-flop E 114. The $Q_B$ is used to align the DATA OUT 32 when the phase value of the shift register 84 is at binary value 1000 86.

The DL 40 and the stretched PR 110 are ANDed in AND gate 108 to produce a high value at flip-flop B's 104 D terminal only when both DL 40 and stretched PR 110 match which corresponds to the start of new cell. Flip-flop B 104 will produce a high SOC 34 value when both DL 40 and the stretched PR 110 match and the PH0 is high.

The first, PH0, and third, PH2, phase values of the shift register 84 are combined in OR gate 124 and input into flip-flop D 126 to produce the CLK OUT 30. Flip-flop flip-flop D 126 is enabled only when either PH0 or PH2 is high. Thus the flip-flop D 126 is active at one fourth the rate of CLK 28. PH2 is chosen as the input to flip-flop D 126 because PH0 would give a false input at reset.

Figure 7:
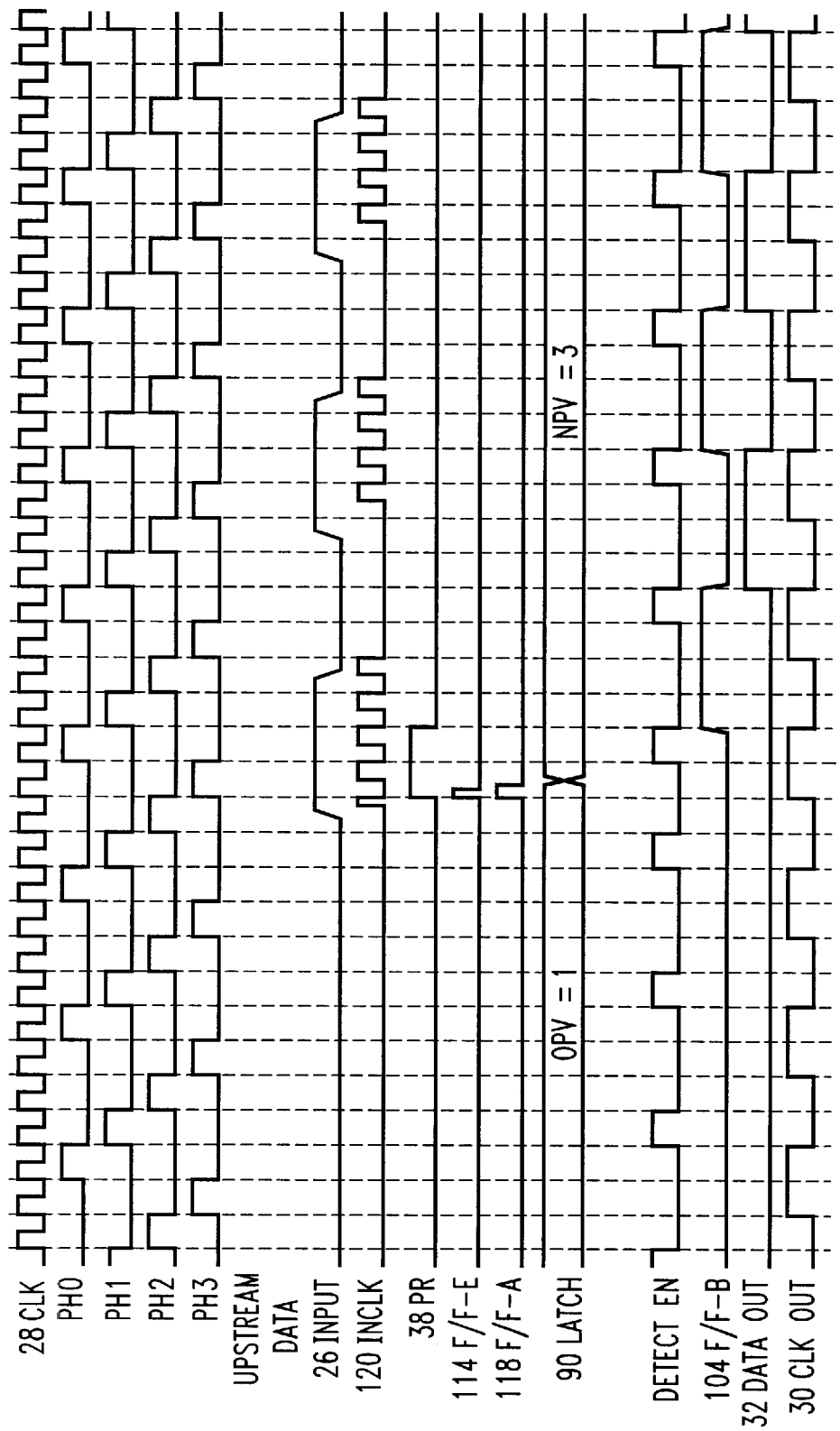
FIG. 7 is a comparative timing of the waveforms at the various inputs and outputs of the digital circuit of FIG. 6.

FIG. 7 is a comparative timing of the waveforms at the various inputs and outputs of the digital circuit of FIG. 6. The waveforms for the CLK 28, the phase encoded values PH0, PH1, PH2, PH3, the upstream data 26, INCLK 120, PR 38, flip-flop E 114, flip-flop A 118, the latch 90, the detector circuit 102 enable from OR gate 100, flip-flop B 104, DATA OUT 32, and CLK OUT 30.

The CLK 28 is shown having set period. In G3 this frequency would be 622.08 Mb/s. The encoded phase values PH0, PH1, and PH2, and PH3 are shown having a period a fourth as fast as CLK 28. As the shift register 84 in FIG. 4 counts through the different phase signals, the signal waveforms of the different phases change by one period of CLK 28. Thus, PH1 lags PH0 by one CLK 28 period, PH2 lags PH1 by one CLK 28 period, and PH3 lags PH2 by one CLK 28 period.

In FIG. 7, the diagram shows that when the upstream data 26 is high the FNCLK 120 signal is generated which has the same period as CLK 28 but inverse in amplitude. Initially when the upstream data 26 is high, a PR 38 signal is produced for two CLK 28 periods. As the PR 38 goes high it generates a high signal in flip-flop E 114. Flip-flop E 114 sets flip-flop A 118 high which in turn quickly clears flip-flop E 114 back to a zero value. Flip-flop A 118 enables the latch 90 to accept the new phase value from the shift register 84 of FIG. 4. As an example, if the old phase value in the latch 90 was PH0 (OPV=1) the new phase value would be PH3 (NPV=3) because the high value of flip-flop A 118 lines up with the high value of PH3.

The OR gate 100 is shown producing a high value every four periods of CLK 28. This is a result of the shift register 84 of FIG. 4 counting through all four phase values before matching the stored phase value in the latch 90. Once the OR gate 100 (detector circuit 102 enablement) output is ANDed with the stretched PR 110 of FIG. 4, flip-flop B 104 produces a pulse, corresponding to the SOC 34 of FIG. 4, that is aligned with the PR 52 and has a period one eighth the CLK 28. DATA OUT 32 is then shown to align to the output of flip-flop B 104. CLK OUT 30 is aligned to DATA OUT 32 and of one-fourth the period of CLK 28.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope.

What is claimed is:

1. A method for allowing recovery of upstream data, characterized by the steps of:
   determining a recovered upstream data clock through employment of a downstream data clock;
   determining recovered output through employment of data that is based on the upstream data; and
   employing the recovered upstream data clock and the recovered output to allow recovery of the upstream data through processing of the recovered output.

2. The method of claim 1, wherein the step of determining the recovered upstream data clock through employment of the downstream data clock and the step of determining the recovered output through employment of the data that is based on the upstream data comprise the steps of:
   generating a plurality of phase signals; and
   determining a closest match between one of the plurality of phase signals and the data that is based on the upstream data.

3. The method of claim 2, wherein the step of determining the recovered upstream data clock through employment of the downstream data clock and the step of determining the recovered output through employment of the data that is based on the upstream data comprise the steps of:
   employing the one of the plurality of phase signals and the data that is based on the upstream data to obtain aligned data; and
   selecting the aligned data to comprise the recovered output.

4. The method of claim 1, wherein the step determining the recovered upstream data clock through employment of the downstream data clock comprises the step of deriving the recovered upstream data clock from the downstream data clock.

5. The method of claim 1, wherein the step of employing the recovered upstream data clock and the recovered output to allow recovery of the upstream data through processing of the recovered output comprises the step of employing the recovered upstream data clock to promote substantial elimination of an effect of phase delay on the recovery of the upstream data.

6. A system tor allowing recovery of upstream data, characterized by:
   a phase-recovery component that determines a recovered upstream data clock through employment of a downstream data clock;
   wherein the phase-recovery component determines recovered output through employment of data that is based on the upstream data; and wherein the phase-recovery component employs the recovered upstream data clock and the recovered output to allow recovery of the upstream data through processing of the recovered output.

7. The system of claim 6, wherein the phase-recovery component comprises:

a phase circuit that Generates a plurality of phase signals; and a combination circuit that determines a closest match between one of the plurality of phase signals and the data that is based on the upstream data.

8. The system of claim 7, wherein the phase-recovery component comprises a phase-alignment circuit that employs the one of the plurality of phase signals and the data that is based on the upstream data to obtain aligned data, and wherein the phase-recovery component selects the aligned data to comprise the recovered output.

9. The system of claim 6, wherein the phase-recovery component derives the recovered upstream data clock from the downstream data clock.

10. The system of claim 6, further comprising a switch that employs the recovered upstream data clock to promote substantial elimination of an effect of phase delay on the recovery of the upstream data.

* * * * *